(12) United States Patent
Curticapean

(10) Patent No.: US 8,547,870 B2
(45) Date of Patent: Oct. 1, 2013

(54) HYBRID POSITIONING MECHANISM FOR WIRELESS COMMUNICATION DEVICES

(75) Inventor: Florean Curticapean, Tampere (FI)

(73) Assignee: QUALCOMM Incorporated, San Diego, CA (US)

( * ) Notice: Subject to any disclaimer, the term of this patent is extended or adjusted under 35 U.S.C. 154(b) by 199 days.

(21) Appl. No.: 13/155,037

(22) Filed: Jun. 7, 2011

(65) Prior Publication Data

US 2012/0314587 A1 Dec. 13, 2012

(51) Int. Cl.
| | |
|---|---|
| H04L 1/00 | (2006.01) |
| H04L 12/26 | (2006.01) |
| H04W 4/00 | (2009.01) |

(52) U.S. Cl.
USPC .......................................... 370/252; 370/328

(58) Field of Classification Search
USPC ................................. 370/252, 328
See application file for complete search history.

(56) References Cited

U.S. PATENT DOCUMENTS

| | | | | |
|---|---|---|---|---|
| 6,034,635 | A * | 3/2000 | Gilhousen | 342/457 |
| 6,166,685 | A | 12/2000 | Soliman | |
| 6,420,999 | B1 | 7/2002 | Vayanos | |
| 6,618,005 | B2 | 9/2003 | Hannah et al. | |
| 6,744,398 | B1 | 6/2004 | Pyner et al. | |
| 7,289,813 | B2 | 10/2007 | Karaoguz | |
| 2001/0053699 | A1 | 12/2001 | McCrady et al. | |
| 2002/0155845 | A1 | 10/2002 | Martorana | |
| 2002/0196184 | A1 | 12/2002 | Johnson et al. | |
| 2003/0134647 | A1 | 7/2003 | Santhoff et al. | |
| 2004/0008138 | A1 * | 1/2004 | Hockley et al. | 342/357.09 |
| 2004/0147269 | A1 | 7/2004 | Kim | |
| 2004/0258012 | A1 | 12/2004 | Ishii | |
| 2004/0264407 | A1 * | 12/2004 | Tang et al. | 370/328 |
| 2005/0135257 | A1 | 6/2005 | Stephens et al. | |
| 2007/0121560 | A1 | 5/2007 | Edge | |
| 2007/0296633 | A1 | 12/2007 | Yanagihara | |
| 2008/0103696 | A1 | 5/2008 | Cheok et al. | |
| 2008/0125161 | A1 | 5/2008 | Ergen et al. | |

(Continued)

FOREIGN PATENT DOCUMENTS

| | | |
|---|---|---|
| WO | 2012170046 | 12/2012 |
| WO | 2012170062 A1 | 12/2012 |

(Continued)

OTHER PUBLICATIONS

Co-pending U.S. Appl. No. 13/315,174, filed Dec. 8, 2011.

(Continued)

*Primary Examiner* — Ronald Abelson
(74) *Attorney, Agent, or Firm* — DeLizio Gilliam, PLLC

(57) ABSTRACT

A wireless communication device can determine its position in accordance with a hybrid positioning mechanism to minimize bandwidth and power consumption at the wireless communication device. The wireless communication device can detect one or more request messages and one or more corresponding response messages exchanged between a master access point and one or more target access points, and can accordingly determine TDOA information associated with the one or more target access points. The wireless communication device can receive, from the master access point, RTT measurement information determined by the master access point based, at least in part, on the one or more request messages and the one or more corresponding response messages exchanged between the master access point and the one or more target access points. The wireless communication device can calculate its position information based, at least in part, on the TDOA information and the RTT measurement information.

23 Claims, 7 Drawing Sheets

(56) References Cited

U.S. PATENT DOCUMENTS

| | | | |
|---|---|---|---|
| 2008/0130604 A1 | 6/2008 | Boyd | |
| 2008/0188236 A1* | 8/2008 | Alles et al. | 455/456.1 |
| 2008/0248741 A1 | 10/2008 | Alizadeh-Shabdiz | |
| 2008/0287139 A1 | 11/2008 | Carlson et al. | |
| 2009/0280825 A1* | 11/2009 | Malik et al. | 455/456.1 |
| 2010/0130225 A1 | 5/2010 | Alles et al. | |
| 2010/0135178 A1 | 6/2010 | Aggarwal et al. | |
| 2010/0150117 A1 | 6/2010 | Aweya et al. | |
| 2011/0059752 A1 | 3/2011 | Garin et al. | |
| 2011/0117925 A1 | 5/2011 | Sampath et al. | |
| 2011/0136506 A1 | 6/2011 | Stewart | |
| 2011/0188389 A1 | 8/2011 | Hedley et al. | |
| 2011/0244881 A1 | 10/2011 | Bando et al. | |
| 2011/0304506 A1 | 12/2011 | Choi | |
| 2012/0087272 A1 | 4/2012 | Lemkin et al. | |
| 2012/0315919 A1 | 12/2012 | Hirsch | |
| 2013/0005347 A1 | 1/2013 | Curticapean | |
| 2013/0072217 A1 | 3/2013 | Zhang et al. | |
| 2013/0072218 A1 | 3/2013 | Zhang et al. | |
| 2013/0072219 A1 | 3/2013 | Zhang et al. | |
| 2013/0072220 A1 | 3/2013 | Zhang et al. | |
| 2013/0100850 A1 | 4/2013 | Zhang et al. | |
| 2013/0148514 A1 | 6/2013 | Zhang et al. | |

FOREIGN PATENT DOCUMENTS

| | | |
|---|---|---|
| WO | 2013002812 A2 | 1/2013 |
| WO | 2013043664 | 3/2013 |
| WO | 2013043675 | 3/2013 |
| WO | 2013043681 | 3/2013 |
| WO | 2013043685 | 3/2013 |
| WO | 2013059636 A1 | 4/2013 |
| WO | 2013086393 | 6/2013 |

OTHER PUBLICATIONS

U.S. Appl. No. 13/158,029 Office Action, Oct. 3, 2012, 18 pages.
U.S. Appl. No. 13/236,172 Office Action, Jun. 7, 2012, 25 pages.
U.S. Appl. No. 13/236,208 Office Action, Nov. 7, 2012, 14 pages.
U.S. Appl. No. 13/236,232 Office Action, Oct. 11, 2012, 13 pages.
International Search Report and Written Opinion—PCT/US2011/054977—ISA/EPO—Jan. 31, 2012, 7 pages.
U.S. Appl. No. 13/158,029, Hirsch; Olaf J.
U.S. Appl. No. 13/170,353, Curticapean; Florean
U.S. Appl. No. 13/236,172, Zhang; Xiaoxin et al.
U.S. Appl. No. 13/236,208, Zhang; Xiaoxin et al.
U.S. Appl. No. 13/236,232, Zhang; Xiaoxin et al.
U.S. Appl. No. 13/236,259, Zhang; Xiaoxin et al.
U.S. Appl. No. 13/278,642, Zhang; Xiaoxin et al.
International Search Report and Written Opinion—PCT/US2011/043781—ISA/EPO—Nov. 17, 2011—, 7 pages.
International Search Report and Written Opinion—PCT/US2011/046074—ISA/EPO—Dec. 16, 2011, 10 pages.
"PCT Application No. PCT/US2011/043781 International Preliminary Report on Patentability", Jun. 7, 2013, 4 pages.
"PCT Application No. PCT/US2011/054977 International Preliminary Report on Patentability", Jun. 10, 2013, 8 pages.
"PCT Application No. PCT/US2012/061081 International Search Report", Mar. 27, 2013, 11 pages.
Foy, W.H., "Position-Location Solutions by Taylor-Series Estimation", IEEE Transactions on Aerospace and Electronic Systems, IEEE Service Center, Piscataway, NJ, US, vol. AES-10, No. 2, Mar. 1, 1976, pp. 187-194, XP011166129, ISSN: 0018-9251.
Kleine-Ostmann, T., et al., "A data fusion architecture for enhanced position estimation in wireless networks", IEEE Communications Letters, IEEE Service Center, Piscataway, NJ, US, vol. 5, No. 8, Aug. 1, 2001, pp. 343-345, XP011423565, ISSN: 1089-7798, DOI: 10.1109/4234.940986 Sections II and III.
Li, H., et al., "Combination of Taylor and Chan method in mobile positioning", Cybernetic Intelligent Systems (CIS), 2011 IEEE 10th International Conference on, IEEE, Sep. 1, 2011, pp. 104-110, XP932136955, DOI : 10.1109/ CIS.2011.6169143 ISBN: 978-1-4673-0687-4 Abstract Sections I-III.
Shen, G., et al., "Performance comparison of TOA and TDOA based location estimation algorithms in LOS environment", (WPNC '08) 5TH, IEEE, Mar. 27, 2008, pp. 71-78, XP031247832, ISBN: 978-1-4244-1798-8 Section II (TOA Based Location Estimation Algorithms}: "C. Taylor Series Method".
Yu, K et al., "TOA-based distributed localisation with unknown internal delays and clock frequency offsets in wireless sensor networks", IET Signal Processing vol. 3, No. 2 XP006032603, ISSN: 1751-9683, 001: 10.104911ET-SPR:20080029 Mar. 2, 2009 , 106-118.
Gholami, Mohammad R. et al., "Positioning algorithms for cooperative networks in the presence of an unknown turn-around time", 2011 IEEE 12th Workshop on Signal Processing Advancesin Wireless Communications (SPAWC 2011) IEEE Piscataway,NJ, USA, IEEE, Piscataway, NJ, USA, XP032035718, 001: 10.11 09/SPAWC.2011.5990386; ISBN: 978-1-4244-9333-3 Jun. 26, 2011 , 166-170.
"U.S. Appl. No. 13/236,172 Office Action", Jan. 3, 2013 , 25 pages.
"PCT/US2012/056046 International Search Report", Jan. 3, 2013 , 13 pages.
PCT Application No. PCT/US2012/068543 International Search Report, Feb. 15, 2013 , 15 pages.
"PCT Application No. PCT/US2012/056036 International Search Report", Jan. 3, 2013 , 13 pages.
"PCT Application No. PCT/US12/56053 International Search Report", Jan. 3, 2013 , 13 pages.
"PCT Application No. PCT/US12/56017 International Search Report", Jan. 3, 2013 , 14 pages.
"PCT Application No. PCT/US2011/046074 International Preliminary Report on Patentability", Jun. 27, 2013, 11 pages.
"U.S. Appl. No. 131278,642 Office Action", Jul. 19, 2013.

* cited by examiner

HYBRID POSITIONING MECHANISM FOR WIRELESS COMMUNICATION DEVICES

BACKGROUND

Embodiments of the inventive subject matter generally relate to the field of wireless communication and, more particularly, to a hybrid positioning mechanism for wireless communication devices.

Various positioning techniques can be employed for determining the position of a wireless communication device (e.g., a wireless local area network (WLAN) device) based on receiving wireless communication signals. For example, positioning techniques can be implemented that utilize time of arrival (TOA), round trip time (RTT) of the wireless communication signals, or time difference of arrival (TDOA) of wireless communication signals to determine the position of a wireless communication device in a wireless communication network.

SUMMARY

Various embodiments of a hybrid positioning mechanism for wireless communication devices are disclosed. In one embodiment, one or more request messages and one or more corresponding response messages exchanged between a master access point of a wireless communication network and one or more target access points of the wireless communication network are detected at a communication device of the wireless communication network. Time difference of arrival (TDOA) information is determined at the communication device based, at least in part, on the one or more request messages and the one or more corresponding response messages exchanged between the master access point and the one or more target access points. An indication of round-trip time (RTT) measurement information is received at the communication device from the master access point. The RTT measurement information is determined by the master access point based, at least in part, on the one or more request messages and the one or more corresponding response messages exchanged between the master access point and the one or more target access points. Position information associated with the communication device is calculated based, at least in part, on the TDOA information and the RTT measurement information.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
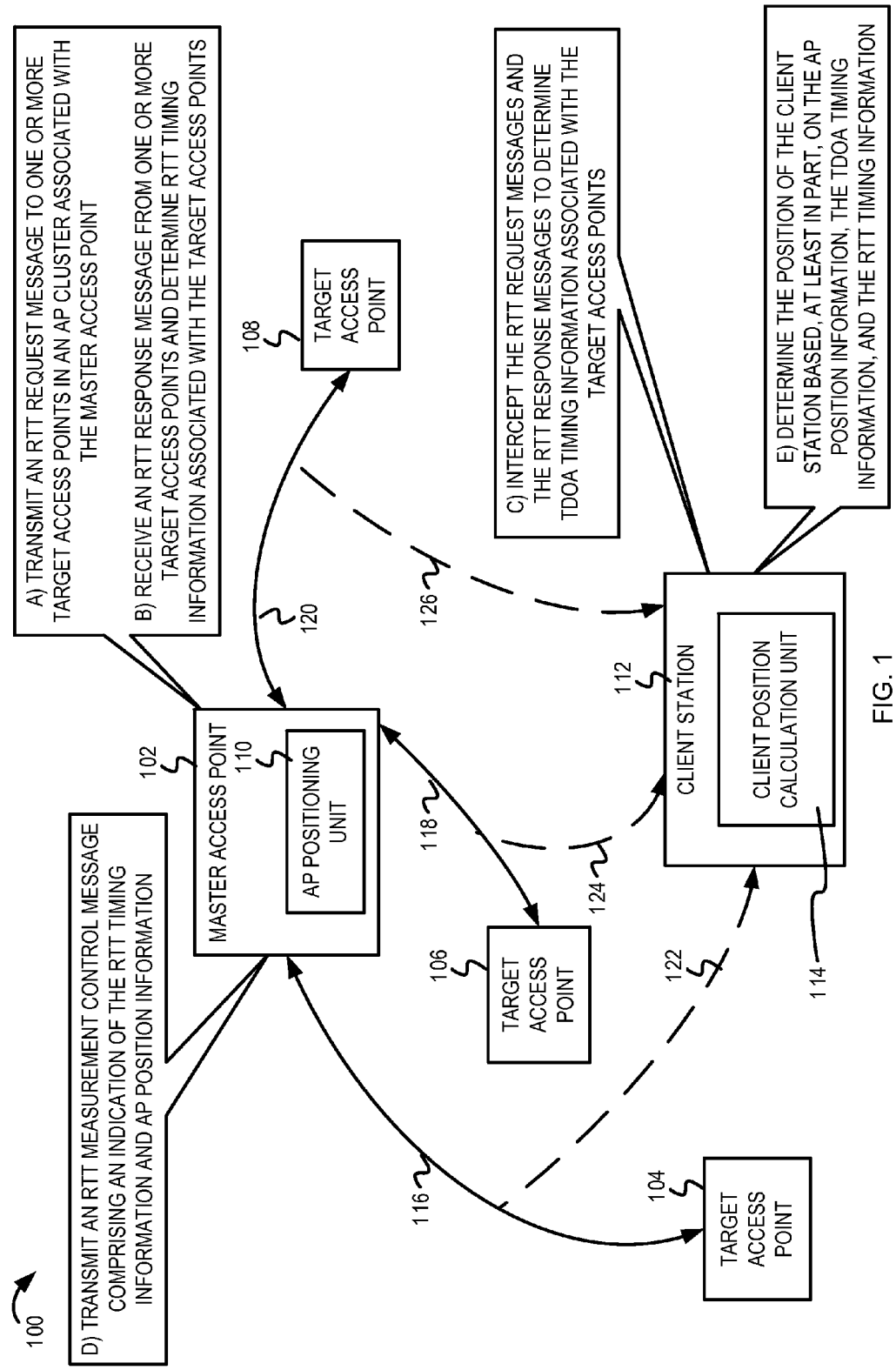
FIG. 1 is an example block diagram illustrating a hybrid TDOA-RTT positioning mechanism for determining the position of a wireless communication device.

The description that follows includes exemplary systems, methods, techniques, instruction sequences, and computer program products that embody techniques of the present inventive subject matter. However, it is understood that the described embodiments may be practiced without these specific details. For instance, although examples refer to a hybrid TDOA-RTT positioning mechanism for wireless local area network (WLAN) devices, embodiments are not so limited. In other embodiments, the hybrid positioning mechanism can be implemented by other wireless standards and devices (e.g., WiMAX devices). In other instances, well-known instruction instances, protocols, structures, and techniques have not been shown in detail in order not to obfuscate the description.

In wireless communication networks, determining the position of an electronic device with wireless communication capabilities (e.g., within an indoor or outdoor environment) can be a desired feature for users of the communication device (e.g., mobile phone users) and operators of the wireless communication network. In some systems, round-trip time (RTT) techniques can be implemented for determining the position of the communication device. For example, the communication device can transmit a request message to multiple access points and can receive a response message from each of the access points. The range between the communication device and each of the access points can be determined by measuring the round trip time between the request messages and the corresponding response messages. The position of the communication device can be determined after at least three such range measurements. In some systems, time difference of arrival (TDOA) techniques can be implemented for determining the position of the communication device. For example, the communication device can determine its position based on the difference between the ranges from each of the access points to the communication device. However, the onus for initiating the RTT positioning operations (or the TDOA positioning operations) (e.g., transmitting the request message to the access points) typically lies on the communication device. Because the communication device plays an active role in transmitting the request messages to each access point, the communication device may consume a substantial amount of bandwidth and power. Moreover, if the wireless communication network comprises multiple such communication devices, each communication device may be required to execute the RTT positioning operations (or the TDOA positioning operations), increasing the traffic load in the wireless communication network.

A position calculation unit of the communication device can be configured to determine the position of the communication device based on a hybrid TDOA-RTT positioning mechanism to reduce the traffic load in the wireless communication network. One of the access points in the wireless communication network configured in a master operating mode ("master access point") can be configured to initiate (e.g., on-demand or periodically) an RTT measurement sequence with one or more target access points in the wireless communication network. The master access point can determine RTT timing information associated with the one or more target access points based on the time difference between an RTT request message transmitted by the master access point and a corresponding RTT response message transmitted by the target access point. The position calculation unit can intercept the RTT request message and the corresponding RTT response message, and can determine TDOA timing information based on the time difference of arrival between the RTT request message and the corresponding RTT response message. The master access point can also transmit an RTT measurement message comprising the RTT timing information to the communication device. The position calculation unit can then determine the position of the communication device based, at least in part, on the TDOA timing information, the RTT timing information, and position information associated with a predetermined number of target access points.

Such a distributed hybrid TDOA-RTT positioning mechanism for determining the position of the communication device can reduce the number of (or, in some cases, even eliminate) transmissions initiated by the communication device for calculating the position of the communication device. This can minimize the impact of the communication device transmissions on the traffic load of the wireless communication network. Furthermore, because the communication device can passively listen for (and detect) the RTT request/response messages and the RTT measurement message, the hybrid positioning mechanism can enable any number of communication devices within the range of the master access point and the target access points to compute their position. This can also minimize bandwidth and power consumption at the communication device.

FIG. 1 is an example conceptual diagram illustrating a hybrid TDOA-RTT positioning mechanism for determining the position of a wireless communication device. FIG. 1 depicts a wireless communication network 100 comprising four access points 102, 104, 106, and 108 and a client station 112. In FIG. 1, the access point 102 may be an advanced WLAN access point capable of determining its own position (e.g., a self-locating access point), herein referred to as a "master access point." The master access point 102 can select one or more other access points 104, 106, and 108 in the wireless communication network 100 (e.g., within the communication range of the master access point 102) and can designate the selected one or more access points as belonging to an "AP cluster" associated with the master access point 102. The access points 104, 106, and 108 that belong to the AP cluster associated with the master access point 102 herein are referred to as "target access points." The master access point 102 comprises an access point (AP) positioning unit 110. In some implementations, each of the target access points 104, 106, and 108 can also comprise their respective AP positioning units. In other implementations, however, the target access points 104, 106, and 108 may not comprise AP positioning units. In some implementations, the target access points 104, 106, and/or 108 may also be self-locating WLAN access points that are not configured in the master access point mode. In other implementations, the target access points 104, 106, and/or 108 can be legacy WLAN access points without advanced self-locating capabilities. The client station 112 comprises a client position calculation unit 114. In one implementation, the client station 112 can be any suitable electronic device (e.g., a notebook computer, a tablet computer, a netbook, a mobile phone, a gaming console, a personal digital assistant (PDA), etc.) with WLAN communication capabilities. Furthermore, in FIG. 1, the client station 112 is within the communication range of the master access point 102 and the target access points 104, 106, and 108.

At stage A, the AP positioning unit 110 of the master access point 102 transmits an RTT request message to one or more target access points 104, 106, and 108 in the AP cluster associated with the master access point 102. In some implementations, the AP positioning unit 110 can initiate an RTT measurement sequence with one or more of the target access points 104, 106, and 108 in the AP cluster in response to receiving a trigger message from the client station 112. In other implementations, the AP positioning unit 110 can initiate the RTT measurement sequence with one or more of the target access points 104, 106, and 108 in the AP cluster at predetermined periodic intervals. In the implementation where the AP positioning unit 110 periodically initiates the RTT measurement sequence without intervention from the client station 112, the AP positioning unit 110 can broadcast a control message indicating the start of the RTT measurement sequence with one or more of the target access points in the AP cluster. The AP positioning unit 110 can then sequentially transmit an RTT request message to some/all of the target access points 104, 106, and 108. The RTT request message can comprise an identifier associated with the master access point 102 (e.g., a network address of the master access point 102), an identifier associated with the target access point (e.g., a network address of the target access point 104), a sequence number that identifies the RTT request message, and a timestamp indicating the time instant at which the RTT request message was transmitted.

At stage B, the AP positioning unit 110 receives an RTT response message from one or more target access points 104, 106, and 108 and determines RTT timing information associated with the target access points. In response to receiving the RTT request message, the target access point (e.g., the target access point 104) can generate and transmit a corresponding RTT response message. In one implementation, the RTT response message can be an acknowledgment (ACK) message that indicates receipt of the RTT request message at the target access point 104. The RTT response message can comprise the identifier associated with the master access point 102, the identifier associated with the target access point 104, the sequence number that identifies the corresponding RTT request message, and a timestamp indicating the time instant at which the RTT response message was transmitted.

The AP positioning unit 110 can receive the RTT response message from the target access point 104, determine the time instant at which the RTT response message was received, and determine the RTT timing information associated with the target access point 104. The AP positioning unit 110 can determine the RTT timing information associated with the access point 104 as the time difference between the time instant at which the RTT request message was transmitted and the time instant at which the RTT response message was received. In the example of FIG. 1, the master access point 102 exchanges RTT request/response messages 116 with the target access point 104, exchanges RTT request/response messages 118 with the target access point 106, and exchanges RTT request/response messages 120 with the target access point 108. The master access point 102 can determine the RTT timing information associated with the target access points 104, 106, and 108 based on the exchanged RTT request/response messages 116, 118, and 120, respectively. Operations of the master access point 102 determining the RTT timing information associated with the target access points 104, 106, and 108 that belong to the AP cluster are further described in FIGS. 2 and 3.

At stage C, the client station 112 intercepts the RTT request messages and the RTT response messages to determine TDOA timing information associated with the target access points 104, 106, and 108. The dashed lines 122, 124, and 126 (shown in FIG. 1) represent the client position calculation unit 114 intercepting the RTT request/response messages 116, 118, and 120 respectively exchanged between the master access point 102 and the target access points in the AP cluster. The client position calculation unit 114 of the client station 112 can measure the arrival time difference between the RTT request messages and the corresponding RTT response messages. For example, the client position calculation unit 114 can determine a first time instant at which the RTT request message (transmitted by the master access point 102 to the target access point 104) was detected at the client station 112. The client position calculation unit 114 can also determine a second time instant at which the RTT response message (transmitted by the target access point 104 to the master access point 102) was detected at the client station 112. The client position calculation unit 114 can subtract the first time instant from the second time instant to determine the TDOA timing information associated with the target access point 104.

At stage D, the AP positioning unit 110 transmits an RTT measurement control message comprising an indication of the RTT timing information and AP position information. After the AP positioning unit 110 determines the RTT timing information (as described above in stages A-B), the AP positioning unit 110 can broadcast the RTT measurement control message comprising the RTT timing information. In one implementation, the AP positioning unit 110 can broadcast a distinct RTT measurement control message for each target access point 104, 106, and 108 to indicate the RTT timing information associated with the target access points 104, 106, and 108 respectively. In addition to the RTT timing information associated with the target access point 104, the RTT measurement control message can also comprise the AP position information. The AP position information can include an indication of the position of the master access point 102 and an indication of the position of the target access point 104. Furthermore, the RTT measurement control message can also comprise an indication of internal propagation time intervals and external propagation time intervals associated with the master access point 102 and the target access point 104, as will be further described below with reference to FIG. 2. It is noted that in another implementation, the AP positioning unit 110 may broadcast one RTT measurement control message that indicates the RTT timing information associated with all the target access points 104, 106, and 108 and the AP position information associated with the master access point 102 and the target access points 104, 106, and 108. The client position calculation unit 114 can receive the RTT measurement control message(s) and can store the AP position information, the TDOA timing information, and the RTT timing information associated with the target access points 104, 106, and 108 in a predetermined memory location, a data structure, or another suitable storage device.

At stage E, the client position calculation unit 114 determines the position of the client station 112 based, at least in part, on the AP position information, the TDOA timing information, and the RTT timing information associated with the target access points. In some implementations, the client position calculation unit 114 can determine to calculate the position of the client station 112 if the AP position information, the TDOA timing information, and the RTT timing information associated with a predetermined number of target access points are known. As will be further described in FIG. 2, the client position calculation unit 114 can use the AP position information, the TDOA timing information, and the RTT timing information to construct a "positioning equation" in terms of the range between the client station 112 and each of the predetermined number of target access points. For example, on determining that AP position information, the TDOA timing information, and the RTT timing information associated with three target access points are available, the client position calculation unit 114 can construct three positioning equations. The client position calculation unit 114 can solve the three positioning equations to determine a three-dimensional position of the client station 112. It is noted that in other implementations, the client position calculation unit 114 can determine the position of the client station 112 based on the AP position information, the TDOA timing information, and the RTT timing information associated with any suitable number of target access points. For example, the client position calculation unit 114 can construct two independent positioning equations from the AP position information, the TDOA timing information, and the RTT timing information associated with two target access points to determine a two-dimensional position of the client station 112.

Figure 2:
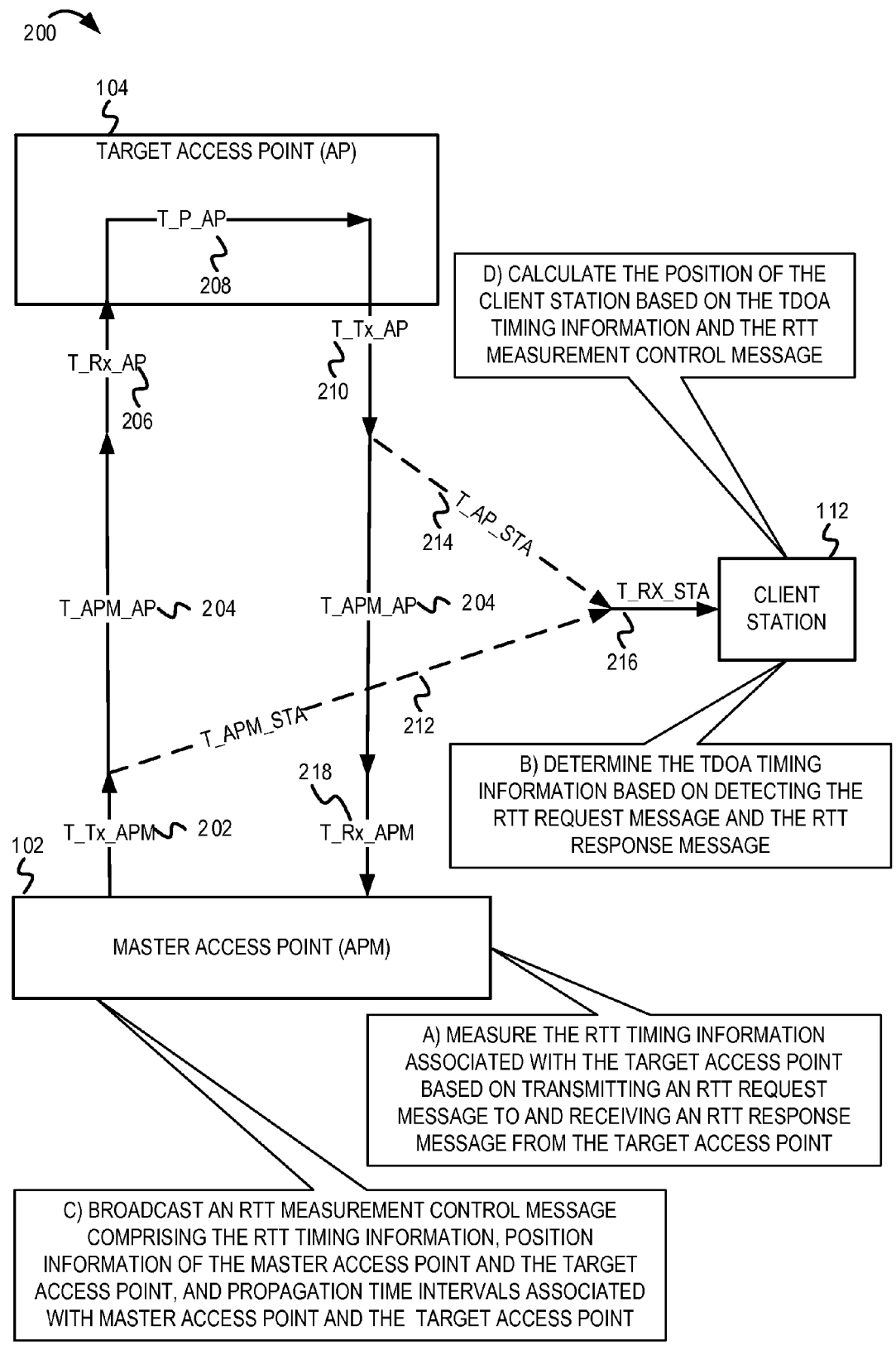
FIG. 2 is an example conceptual diagram illustrating a hybrid TDOA-RTT positioning mechanism for calculating the position of a client station

FIG. 2 is an example conceptual diagram illustrating a hybrid TDOA/RTT positioning mechanism for calculating the position of a client station. FIG. 2 depicts the client station 112, the master access point 102, and the target access point 104. For clarity, in FIG. 2, the master access point 102 is referred to as "APM" and the target access point 104 is referred to as "AP." FIG. 2 also depicts the time elapsed during various segments associated with exchanging RTT request/response messages between the master access point 102 and the target access point 104, as will be described below.

At stage A, the master access point 102 measures the RTT timing information associated with the target access point 104 based on transmitting an RTT request message to and receiving an RTT response message from the target access point 104. As described above in FIG. 1, the master access point 102 can record the time instant at which the RTT request message was transmitted to the target access point 104, and can record the time instant at which the RTT response message was received at the master access point 102. The RTT timing information associated with the target access point 104 can be calculated as a difference between the time instant at which the RTT request message was transmitted from the master access point 102 and the time instant at which the RTT response message was received at the master access point 102. The RTT timing information associated with the target access point 104 can also be expressed in terms of one or more propagation time intervals associated with the master access point 102 and the target access point 104, as will be described below.

In FIG. 2, the time interval $T_{TX-APM}$ 202 and the time interval $T_{RX-APM}$ 218 represent the propagation time interval inside the transmitter unit and the receiver unit associated with the master access point 102 respectively. For example, the time interval 202 can represent the elapsed time between the master access point 102 generating the RTT request message and the transmit antenna associated with the master access point 102 transmitting the RTT request message to the target access point 104. Likewise, the time interval 218 can represent the elapsed time between the receiver antenna associated with the master access point 102 receiving the RTT response message and the processing units associated with the master access point 102 receiving the RTT request message for subsequent processing. The time interval $T_{RX-AP}$ 206 and the time interval $T_{TX-AP}$ 210 represent the propagation time interval inside the receiver unit and the transmitter unit associated with the target access point 104 respectively. The time interval $T_{P-AP}$ 208 represents the processing time (or turn-around time) associated with the processing units of target access point 104. The processing time interval 208 can comprise the time required by the processing units of the target access point 104 to decode the RTT request message, generate the corresponding RTT response message, and provide the RTT response message for subsequent transmission. The processing time interval 208 can also comprise interframe delay (e.g., short inter-frame space (SIFS)).

Furthermore, in one implementation, the master access point 102 can calculate the external propagation time interval 204 based on knowledge of the position of the master access point 102 and the position of the target access point 104. In another implementation, the master access point 102 can calculate the external propagation time interval 204 based on knowledge of the time instant at which the RTT request message was transmitted, the time instant at which the RTT response message was transmitted, and internal propagation time intervals 206, 208, and 210 associated with the target access point 104. In FIG. 2, the time interval $T_{APM-AP}$ 204 represents the external propagation time interval between the antenna associated with the master access point 102 and the antenna associated with the target access point 104. In FIG. 2, the time interval 204 can represent the time interval between the master access point 102 transmitting the RTT request message and the target access point 104 receiving the RTT request message. The time interval 204 can also represent the time interval between the target access point 104 transmitting the RTT response message and the master access point 102 receiving the RTT response message. The RTT timing information ($\Delta_{RTT}$) associated with the target access point 104 can be expressed as a sum of the propagation time intervals 202, 204, 206, 208, 210, and 218, as represented by Eq. 1.

$$\Delta_{RTT} = T_{TX-APM} + 2*T_{APM-AP} + T_{RX-AP} + T_{P-AP} + T_{TX-AP} + T_{RX-APM} \qquad \text{Eq. 1}$$

At stage B, the client station determines the TDOA timing information based on detecting the RTT request message and the RTT response message. In one example, the RTT request message can indicate the time instant at which the master access point 102 transmitted the RTT request message and the RTT response message can indicate the time instant at which the target access point 104 transmitted the RTT response message. The client position calculation unit 114 can determine the transit time associated with the RTT request/response messages based on the time instants at which the RTT request/response messages were transmitted and based on the time instants at which the RTT request/response messages were detected at the client station 112. The TDOA timing information associated with the target access point 102 can be calculated as a time difference between the time instants at which the RTT request message and the RTT response message were detected. The TDOA timing information associated with the target access point 104 can also be expressed in terms of the transit time intervals and one or more propagation time intervals, as will be described below.

In FIG. 2, the time interval $T_{APM-STA}$ 212 represents the transit time between the transmit antenna associated with the master access point 102 and a receive antenna associated with the client station 112. In other words, the time interval 212 can indicate the elapsed time between the instant at which the master access point 102 transmitted the RTT request message and the instant at which the client station 112 detected the RTT request message. Likewise, the time interval $T_{AP-STA}$ 214 represents the transit time between the instant at which the target access point 104 transmitted the RTT response message and the instant at which the client station 112 detected the RTT response message. The client position calculation unit 114 can also determine (e.g., read from a predetermined memory location) the client internal propagation time interval $T_{RX-STA}$ 216 prior to determining the position of the client station 112. The time interval 216 can represent the propagation time interval inside the receiver unit associated with the client station 112 (e.g., between the receiver antenna associated with the client station 112 receiving the positioning control messages and the processing units associated with the client station 112 processing the positioning control messages). The TDOA timing information ($\Delta_{TDOA}$) can be expressed based on the transit time intervals 212 and 214 and the propagation time intervals (described at stage A), as depicted in Eq. 2.

$$\Delta_{TDOA} = T_{APM-AP} + (T_{RX-AP} + T_{P-AP} + T_{TX-AP}) + T_{AP-STA} + T_{RX-STA} - (T_{APM-STA} + T_{RX-STA}) \qquad \text{Eq. 2}$$

At stage C, the master access point 102 broadcasts an RTT measurement control message comprising the RTT timing information (determined at stage A), position information of the master access point 102 and the target access point 104, and propagation time intervals associated with master access point 102 and the target access point 104. Various techniques can be employed (e.g., by the AP positioning unit 110) to determine the position information of the master access point 102 and the target access point 104, and the propagation time intervals associated with master access point 102 and the target access point 104. In some implementations, the master access point 102 can calculate its own position (e.g., using suitable self-locating techniques). In some implementations, the target access point 104 can provide an indication of its position to the master access point 102. In other implementations, however, the master access point 102 can determine its position and the position of the target access point 104 (collectively referred to as "AP position information") based on reading a predetermined memory location, accessing a database, and/or querying a server for the AP position information. Likewise, in some implementations, the master access point 102 can calculate the internal propagation time intervals 202, 218 associated with the master access point 102 and can receive an indication of the internal propagation time intervals 206, 208, 210 associated with the target access point 104. The master access point 102 may also read a predetermined memory location, access a database, and/or query a server for one or more of the internal propagation time intervals 202, 218, 206, 208, and 210. In some implementations, in addition to the RTT timing information, the RTT measurement control message can also comprise one or more of the internal propagation time intervals 202, 206, 208, 210, and 218 and the external propagation time interval 204.

Although not depicted in FIG. 2 for clarity, it is noted that the client station 112 can execute the operations described in stages A, B, and C for a predetermined number of target access points (e.g., at least three target access points). With reference to the example of FIG. 1, in addition to determining the TDOA timing information and the RTT timing information associated with the target access point 104, the client station 112 can determine the TDOA timing information and the RTT timing information associated with the target access points 106 and 108. The client station 112 can also determine the internal propagation time intervals and position of the master access point 102 and the target access points 104, 106, and 108. After the aforementioned information associated with the predetermined number of target access points is determined, the position of the client station 112 can be calculated, as described below in stage D.

At stage D, the client station 112 calculates the position of the client station 112 based, at least in part, on the TDOA timing information and the RTT measurement control message. Based, at least in part, on the RTT timing information (determined at stages A and C), the TDOA timing information (determined at stage B), the client station 112 can determine the propagation time interval ($T_{AP\text{-}STA}$) between the client station 112 and the target access point 104 as depicted in Eq. 3.

$$T_{AP\text{-}STA} = T_{DOA} + T_{APM\text{-}AP} + T_{TX\text{-}APM} + T_{R\text{-}APM} + \Delta_{RTT} + T_{APM\text{-}STA} \quad \text{Eq. 3}$$

The client station 112 can similarly determine (in accordance with Eq. 3) the propagation time intervals between the client and each of the predetermined number of target access points. The client station 112 can convert the propagation time interval between the client station 112 and the target access point 104 into a corresponding range equivalent to yield the positioning equation depicted in Eq. 4. As depicted below in Eq. 4, the client station 112 can determine the positioning equation associated with the target access point 104 in terms of a range difference between the range ($R_{APM\text{-}STA}$) from the master access point 102 to the client station 112 and the range ($R_{AP\text{-}STA}$) from the target access point 104 to the client station 112. Also, c is the speed of light.

$$R_{AP\text{-}STA} - R_{APM\text{-}STA} = c^* \Delta_{TDOA} + c^*(T_{AP\text{-}APM} + T_{TX\text{-}APM} + T_{R\text{-}APM} + \Delta_{RTT}) \quad \text{Eq. 4}$$

The client station 112 can similarly construct (in accordance with Eq. 4) positioning equations based on the propagation time intervals between the client and each of the predetermined number of target access points. After the client station 112 constructs a predetermined number of positioning equations (e.g., three independent positioning equations to determine a three-dimensional position of the client station 112), the client station 112 can solve the positioning equations using any suitable equation solving procedure to determine the position of the client station 112.

It should be noted that both the RTT timing information (of Eq. 1) determined by the master access point 102 and the TDOA timing information (of Eq. 2) determined by the client station 112 can be expressed in terms of the propagation time intervals 206, 208, and 210 associated with the target access point 104. In other words, when the client station 112 and the master access point 102 determine the TDOA timing information and the RTT timing information respectively from the same set of RTT request/response messages, the positioning equations (of Eq. 4) may be independent of the propagation time intervals 206, 208, and 210 associated with the target access point 104. Therefore, in some implementations, the position of the client station 112 may be independent of the propagation time intervals 206, 208, and 210 associated with the target access point 104. This can preclude the need for calibrating the propagation time intervals 206, 208, and 210 associated with the target access point 104.

Figure 3:
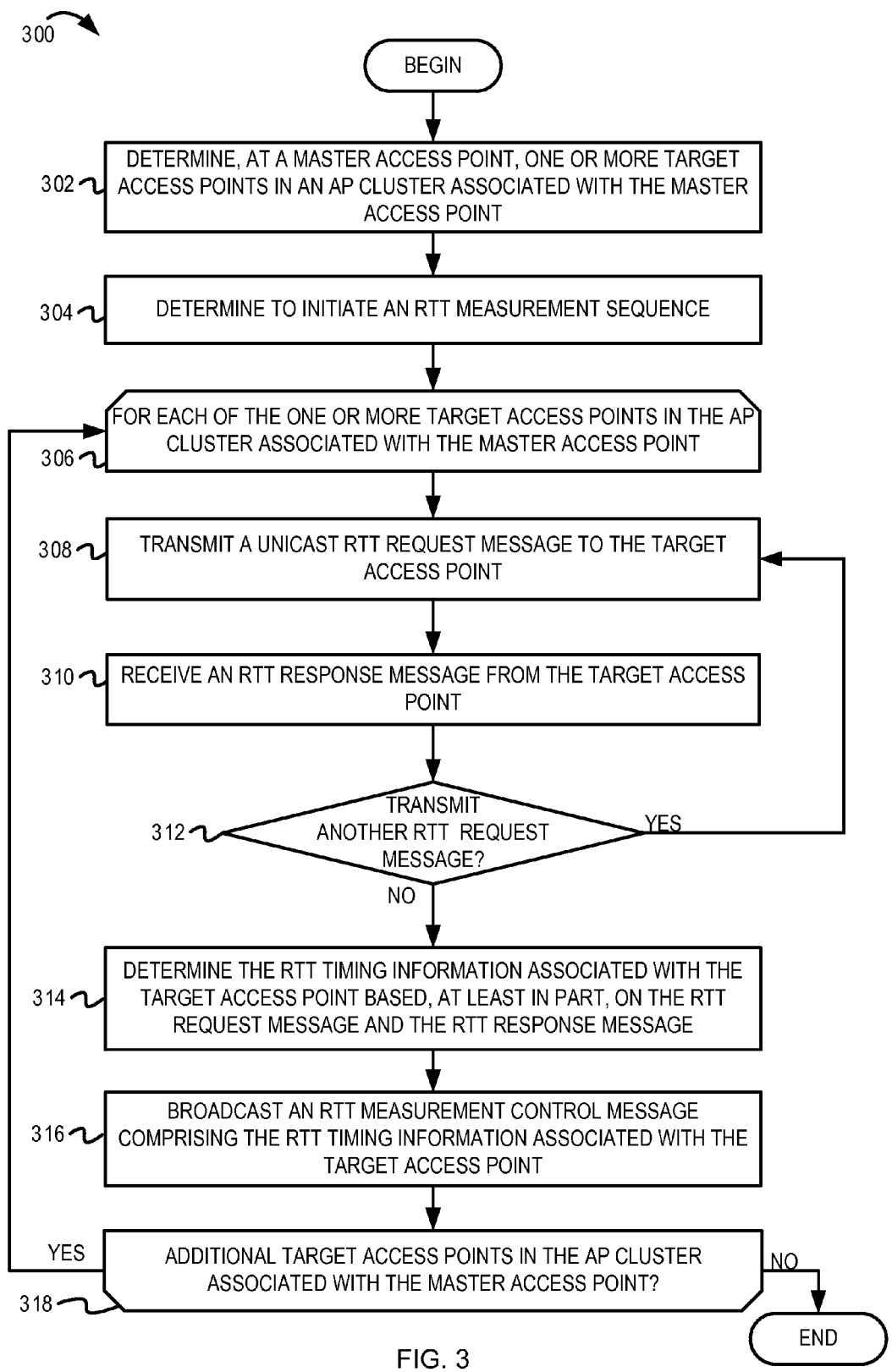
FIG. 3 is a flow diagram illustrating example operations of a master access point determining the RTT timing information based on exchanging RTT messages with target access points.

FIG. 3 is a flow diagram ("flow") 300 illustrating example operations of a master access point determining the RTT timing information based on exchanging RTT messages with the target access points. The flow 300 begins at block 302.

At block 302, a master access point determines one or more target access points in an AP cluster associated with the master access point. In the example of FIG. 1, the AP positioning unit 110 of the master access point 102 can determine that the target access points 104, 106, and 108 belong to the AP cluster associated with the master access point 102. In one implementation, the AP positioning unit 110 can scan all the available wireless communication channels to identify the access points 104, 106, and 108 within the communication range of the master access point 102 (e.g., based on receiving beacon messages). The AP positioning unit 110 can designate the access points 104, 106, and 108 within the communication range of the master access point 102 as the target access points that belong to the AP cluster. In another implementation, the AP positioning unit 110 can designate the access points 104, 106, and 108 as target access points that belong to the AP cluster if the received signal strength indicator (RSSI) associated with beacon messages received from the access points 104, 106, and 108 is greater than a predetermined RSSI threshold. In another implementation, the AP positioning unit 110 can designate the access points 104, 106, and 108 as target access points if the access points 104, 106, and 108 and the master access point 102 are programmed to communicate via a common wireless communication channel. In other words, the access point 104 may not be designated as part of the AP cluster associated with the master access point 102 if the AP positioning unit 110 determines that the access point 104 and the master access point 102 are programmed to communicate via different wireless communication channels. In another implementation, the AP positioning unit 110 can indicate that the access points 104, 106, and 108 belong to the AP cluster if the position (e.g., coordinates in three-dimensional or two-dimensional space) of the access points 104, 106, and 108 is known at the master access point 102. The flow continues at block 304.

At block 304, the master access point determines to initiate an RTT measurement sequence. In some embodiments, the AP positioning unit 110 can determine to initiate the RTT measurement sequence in response to receiving a trigger message from the client station 112. For example, the client station 112 can transmit a "start RTT measurement sequence" trigger message to the master access point 102 to cause the AP positioning unit 110 to initiate the RTT measurement sequence with one or more target access points 104, 106, and 108. In one implementation, as part of the "start RTT measurement sequence" trigger message, the client station 112 can also identify one or more target access points with which the master access point 102 should initiate the RTT measurement sequence, as will be further described in FIG. 4. In other embodiments, the AP positioning unit 110 can initiate the RTT measurement sequence at periodic measurement intervals. In this implementation, the AP positioning unit 110 can broadcast a "RTT measurement initiated" control message to indicate (e.g., to the client station 112) the start of the RTT measurement sequence and/or one or more target access points with which the RTT measurement sequence will be initiated. It is noted that the periodicity with which the master access point 102 initiates the RTT measurement sequence can be configurable and may be based on how often the client stations are configured to recalculate their position. For example, if the client station 112 is configured to recalculate its position every 1 second, the master access point 102 may be configured to initiate the RTT measurement sequence at least every 500 milliseconds (e.g., to ensure that the client station 112 has at least two opportunities to detect the RTT request/response messages and to calculate its position). The traffic load in the wireless communication network 100 and the impact of the RTT measurement sequence on data transfer operations of the master access point 102 can also be taken into consideration in determining how often the master access point 102 should initiate the RTT measurement sequence. The flow continues at block 306.

At block 306, a loop begins for each of the one or more target access points in the AP cluster associated with the master access point. For example, the AP positioning unit 110 can initiate a loop to execute operations described below in blocks 308-316 for the target access points 104, 106, and 108. It is noted, however, that in other implementations, the client station 112 can request that the master access point 102 initiate the RTT measurement sequence with only a subset of the target access points in the AP cluster, as will be further described in FIG. 4. The flow continues at block 308.

At block 308, a unicast RTT request message is transmitted to the target access point. For example, the AP positioning unit 110 can transmit (or can cause a transceiver unit to transmit) the RTT request message to the target access point 104. In one implementation, the RTT request message can comprise an identifier of the master access point 102, an identifier of the target access point 104, a sequence number identifying the RTT request message, and a timestamp indicating a time instant at which the RTT request message was transmitted by the master access point 102. The flow continues at block 310.

At block 310, an RTT response message is received from the target access point. For example, the AP positioning unit 110 can receive the RTT response message from the target access point 104, in response to transmitting the RTT request message at block 308. In one example, the RTT response message can comprise a timestamp indicating the time instant at which the RTT response message was transmitted by the target access point 104, the identifier of the master access point 102, the identifier of the target access point 104, and the sequence number associated with the corresponding RTT request message. On receiving the RTT response message, the AP positioning unit 110 can also record the time instant at which the RTT response message was received at the master access point 102. The flow continues at block 312.

At block 312, it is determined whether to transmit another RTT request message. For example, the AP positioning unit 110 can determine whether to transmit another RTT request message to the same target access point 104. In some implementations, the AP positioning unit 110 can transmit multiple RTT request messages to the same target access point 104 (e.g., burst-like procedure). In other implementations, the AP positioning unit 110 may transmit only one RTT request message to the target access point 104. If it is determined to transmit another RTT request message to the target access point 104, the flow loops back to block 308. Otherwise, the flow continues at block 314.

At block 314, the RTT timing information associated with the target access point is determined based, at least in part, on the RTT request message and the RTT response message. For example, as described above in FIG. 2, the AP positioning unit 110 can determine the RTT timing information ($\Delta_{RTT}$) associated with the target access point 104 based on the time instant at which the RTT request message was transmitted from the master access point 102 and the time instant at which the RTT response message was received at the master access point 102 (e.g., in accordance with Eq. 1). The flow continues at block 316.

At block 316, an RTT measurement control message comprising the RTT timing information associated with the target access point is broadcast. For example, the master access point 102 can generate the RTT measurement control message comprising the RTT timing information associated with the access point 104 (determined at block 314). The RTT measurement control message can also comprise an indication of the positions (e.g., three-dimensional geospatial coordinates, Cartesian coordinates, etc.) of the master access point 102 and the target access point 104. In some implementations, as part of the RTT measurement control message, the AP positioning unit 110 can also transmit an indication of the internal and external propagation time intervals associated with the master access point 102 and the target access point 104 (as was described above with reference to FIG. 2). The flow continues at block 318.

At block 318, it is determined whether there exist additional target access points in the AP cluster associated with the master access point. For example, the AP positioning unit 110 can determine whether there exist additional target access points with which to exchange RTT request/response messages. The AP positioning unit 110 can determine whether to transmit the RTT request message to another target access point based on a list of target access points 104, 106, and 108 in the AP cluster previously identified at block 302 and/or based on an indication received from the client station 112 (as will be described in FIG. 4). It is noted that the AP positioning unit 110 may continuously monitor beacon messages (or other suitable messages) received from other access points in the vicinity of the master access point 102 to update the list of target access points that belong to the AP cluster associated with the master access point 102. If the AP positioning unit 110 determines to transmit an RTT request message to another target access point, the flow continues at block 306. Otherwise, the flow ends.

Figure 4:
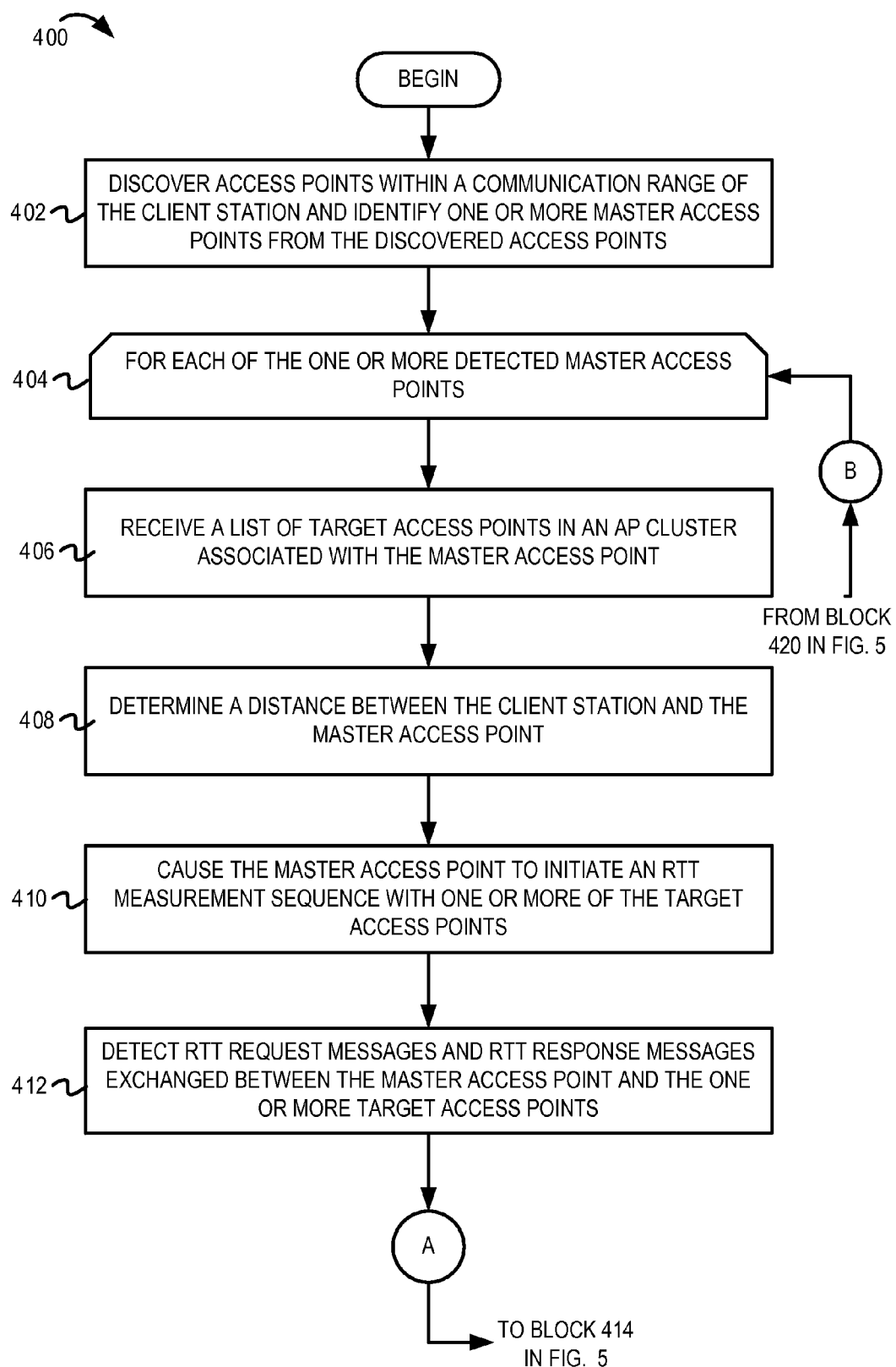
FIG. 4 is a flow diagram illustrating example operations of one embodiment of a hybrid TDOA-RTT positioning mechanism for calculating the position of the client station.
Figure 5:
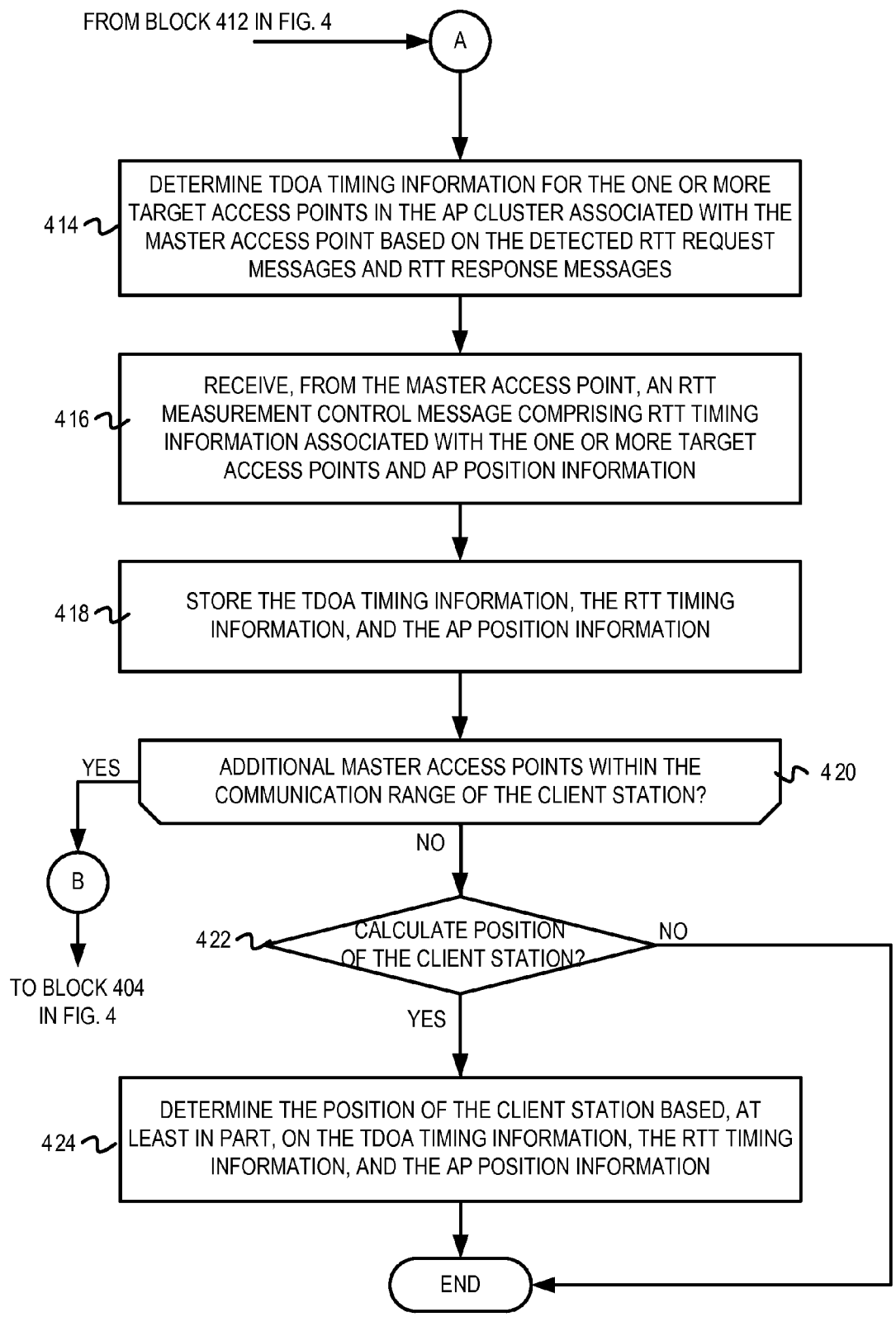
FIG. 5 is a continuation of FIG. 4 and also illustrates example operations of the hybrid TDOA-RTT positioning mechanism for calculating the position of the client station.

FIG. 4 and FIG. 5 depict a flow diagram 400 illustrating example operations of one embodiment of a hybrid TDOA-RTT positioning mechanism for calculating the position of the client station. The flow begins at block 402 in FIG. 4.

At block 402, a client station discovers access points within a communication range of the client station. With reference to the example of FIG. 1, the client position calculation unit 114 can determine that the access points 102, 104, 106, and 108 are within the communication range of the client station 112 in response to receiving beacon messages (or other suitable control messages) from the access points. In another implementation, the client position calculation unit 114 can determine that the access points 102, 104, 106, and 108 are within the communication range of the client station 112 in response to determining that the RSSI associated with the received beacon messages is greater than a predetermined RSSI threshold. Additionally, the client position calculation unit 114 can also determine that the access point 102 is a master access point. In some implementations, the beacon message received from the access point 102 can comprise an indication that the access point 102 is a master access point. In one example, an operating mode flag in the beacon message may be set to a predetermined value (e.g., operating mode flag=1) to indicate that the access point 102 is a master access point and comprises an AP cluster including one or more target access points. In some embodiments, the client position calculation unit 114 can detect two or more master access points (e.g., based on analyzing the received beacon messages). The flow continues at block 404.

At block 404, a loop begins for each of the one or more detected master access points. For example, the client position calculation unit 114 can initiate a loop to execute the operations described in blocks 406-420 for each of the one or more detected master access points 102. The flow continues at block 406.

At block 406, a list of target access points in the AP cluster associated with the master access point 102 is received. For example, the client position calculation unit 114 can transmit a request (to the master access point 102) for the list of target access points in the AP cluster associated with the master access point 102. As described above, in one implementation, the target access points in the AP cluster associated with the master access point 102 can comprise other access points in the wireless communication network 100 that are within the communication range of the master access point 102. In the example of FIG. 1, the client position calculation unit 114 can receive an indication that the access points 104, 106, and 108 belong to the AP cluster associated with the master access point 102. In addition, the master access point 102 can also indicate a basic service set identifier (BSSID) associated with the access points 102, 104, 106, and 108, one or more wireless communication channels associated with the access points 102, 104, 106, and 108, and/or other such information. The flow continues at block 408.

At block 408, a distance between the client station and the master access point is determined. For example, the client position calculation unit 114 can determine the distance between the client station 112 and the master access point 102. The client position calculation unit 114 can record the time instant at which a request for the list of target access points associated with the master access point 102 was transmitted to the master access point 102 at block 406. The client position calculation unit 114 can also record the time instant at which the master access point 102 transmitted a response to the client station 112. The client position calculation unit 114 can calculate the round-trip transit time to the master access point 102 and can determine the distance between the client station 112 and the master access point 102. In other implementations, the client position calculation unit 114 can exchange other suitable control messages with the master access point 102 to determine the round-trip transit time to the master access point 102 and the distance between the client station 112 and the master access point 102. The distance ($R_{APM\text{-}STA}$) between the client station 112 and the master access point 102 may be used to calculate the position of the client station 112, as described above in FIG. 2. The flow continues at block 410.

At block 410, the client station 112 causes the master access point to initiate an RTT measurement sequence with one or more of the target access points. For example, the client position calculation unit 114 can transmit a "start RTT measurement sequence" trigger message to the master access point 102 to cause the master access point 102 to initiate the RTT measurement sequence with the target access points 104, 106, and 108 in the AP cluster. In some implementations, the client position calculation unit 114 can also indicate a subset of the target access points with which the master access point 102 should initiate the RTT measurement sequence based on the target access points accessible to the client station 112. For example, the client position calculation unit 114 may receive an indication (at block 406) that the target access points 104, 106, and 108 belong to the AP cluster associated with the master access point 102. The client position calculation unit 114 may determine that the target access point 106 is not within the communication range of (i.e., is not "accessible" or "visible" to) the client station 112. Therefore, the client position calculation unit 114 may indicate that the master access point 102 should only initiate the RTT measurement sequence with the target access points 104 and 108. As another example, the client position calculation unit 114 may receive an indication (at block 406) that the AP cluster associated with the master access point 102 comprises 20 target access points. The client position calculation unit 114 may identify 5 target access points (e.g., those that are closest to the client station 112) and may direct the master access point 102 to initiate the RTT measurement sequence with the identified 5 target access points. Operations of the master access point 102 for executing the RTT measurement sequence for one or more target access points within its AP cluster were described above in FIG. 3. The flow continues at block 412.

At block 412, RTT request messages and RTT response messages exchanged between the master access point and one or more of the target access points are detected. For example, the client position calculation unit 114 can detect the RTT request/response messages exchanged between the master access point 102 and each of the target access points 104, 106, and 108. In one implementation, the client position calculation unit 114 can listen for RTT request/response control messages on a previously designated wireless communication channel. In another implementation, the client position calculation unit 114 can scan all (or a predetermined subset of) the available wireless communication channels to detect the RTT request/response messages. In some implementations, the client position calculation unit 114 can switch across wireless communication channels in accordance with a channel switching sequence, at specified time instants, and/or after specified time intervals (which may be predefined or indicated by the master access point 102). The flow continues at block 414 in FIG. 5.

At block 414, TDOA timing information for the one or more target access points in the AP cluster associated with the master access point is determined based on the RTT request messages and the RTT response messages. For example, as described above with reference to FIG. 2, the client position calculation unit 114 can determine the TDOA timing information ($\Delta_{TDOA}$) associated with each of the target access points 104, 106, and 108 based on the RTT request and response messages that are detected at the client station 112 (in accordance with Eq. 2). The flow continues at block 416.

At block 416, an RTT measurement control message comprising RTT timing information associated with the one or more target access points and AP position information is received from the master access point. For example, the client position calculation unit 114 can receive the RTT measurement control message from the master access point 102. In one implementation (as described above in FIG. 3), the client position calculation unit 114 may receive one RTT measurement control message for each target access point 104, 106, and 108 comprising the corresponding RTT timing information. In another implementation, however, the client position calculation unit 114 may receive only one RTT measurement control message comprising the RTT timing information associated with all the target access points 104, 106, and 108. In addition to the RTT timing information (expressed in accordance with Eq. 1), the RTT measurement control message can also comprise an indication of the positions (e.g., in three-dimensional coordinates, geospatial coordinates, etc.) of the master access point 102 and the target access points 104, 106, and 108. The RTT measurement control message can also indicate the internal propagation time intervals 206, 208, 210 associated with the target access points 104, 106, and 108, the internal propagation time intervals 202, 218 associated with the master access point 102, and/or the external propagation time interval 204 (as described above in FIG. 2). The flow continues at block 418.

At block 418, the TDOA timing information, the RTT timing information, and the AP position information is stored. For example, the client position calculation unit 114 can store the TDOA timing information, the RTT timing information, and the AP position information, and/or the propagation time intervals at a predetermined memory location, in a data structure, or another data storage device. As described above in FIG. 1-2, the client position calculation unit 114 can use the stored information to calculate the position of the client station 112. In one implementation, the client position calculation unit 114 can temporarily store the AP position information and can discard the stored AP position information after determining the position of the client station 112. In another implementation, the client position calculation unit 114 can store the AP position information until new AP position information (e.g., new values of the position of the access points) is determined. The flow continues at block 420.

At block 420, it is determined whether there exist additional master access points within the communication range of the client station. For example, the client position calculation unit 114 can determine whether there exist additional master access points within the communication range of the client station 112. If it is determined that there exist additional master access points within the communication range of the client station 112, the flow loops back to block 404, where the next master access point is identified and operations described above in blocks 406-418 are executed for the next master access point. Otherwise, the flow continues at block 422. It is noted, however, that in some implementations, the client position calculation unit 114 can execute the operations described above in blocks 406-418 with only one (or a subset of) the master access points detected at block 402. In some implementations, some of the master access points may operate as target access points (e.g., if the communication network does not comprise a sufficient number of target access points).

At block 420, it is determined whether the position of the client station can be calculated. For example, the client position calculation unit 114 can determine whether the position of the client station 112 can be calculated based, a least in part, on the TDOA timing information, the RTT timing information, and the AP position information. In determining whether the position of the client station 112 can be calculated, the client position calculation unit 114 can determine whether the TDOA timing information, the RTT timing information, and the AP position information associated with at least a predetermined number of target access points are known (in addition to the AP position information associated with the master access point 102). In one example, to calculate a two-dimensional position of the client station 112, the client position calculation unit 114 can determine whether the TDOA timing information, the RTT timing information, and the AP position information associated with at least two target access points and the AP position information associated with the master access point 102 are known. In another example, to calculate a three-dimensional position of the client station 112, the client position calculation unit 114 can determine whether (in addition to the AP position information associated with the master access point 102) the TDOA timing information, the RTT timing information, and the AP position information associated with at least three target access points are known. If it is determined that the position of the client station 112 can be calculated, the flow continues at block 424. Otherwise, the flow ends.

At block 424, the position of the client station is determined based, at least in part, on the TDOA timing information, the RTT timing information, and the AP position information. The flow 400 moves from block 420 to block 424 if the client position calculation unit 114 determines that the TDOA timing information, the RTT timing information, and the AP position information associated with at least a predetermined number of target access points are known. The client position calculation unit 114 can construct at least the predetermined number of independent positioning equations (expressed in accordance with Eq. 4) from the TDOA timing information (determined at block 414), the RTT timing information (determined at block 416), and the AP position information (determined at block 416), as described above in FIG. 2. The positioning equations can be expressed in terms of a range difference between the distance from the client station 112 to the master access point 102 and the distance from the client station 112 to the target access point 104. The client position calculation unit 114 can solve the positioning equations using any suitable techniques to determine the position of the client station 112. From block 424, the flow ends.

The operations of FIGS. 4-5 rely on the client station 112 to prompt (e.g., by transmitting a "start RTT measurement sequence" trigger message) the master access point 102 to initiate the RTT measurement sequence with the target access points 104, 106, and 108. For multiple client stations to calculate their respective positions, each of the client stations may independently cause (e.g., by transmitting their respective "start RTT measurement sequence" trigger messages) the master access point 102 to initiate the RTT measurement sequence. In some embodiments, after one of the client stations causes the master access point 102 to initiate the RTT measurement sequence, the other client stations can detect an ongoing RTT measurement sequence, begin to intercept the RTT request/response messages, and calculate their respective positions without transmitting the "start RTT measurement sequence" trigger message. Furthermore, in some implementations, any number of client stations within the communication range of the master access point 102 and the target access points 104, 106, and 108 can calculate their respective positions without transmitting any control messages to the master access point 102, when the master access point 102 is configured to periodically initiate the RTT measurement sequence, as described below in FIG. 6.

Figure 6:
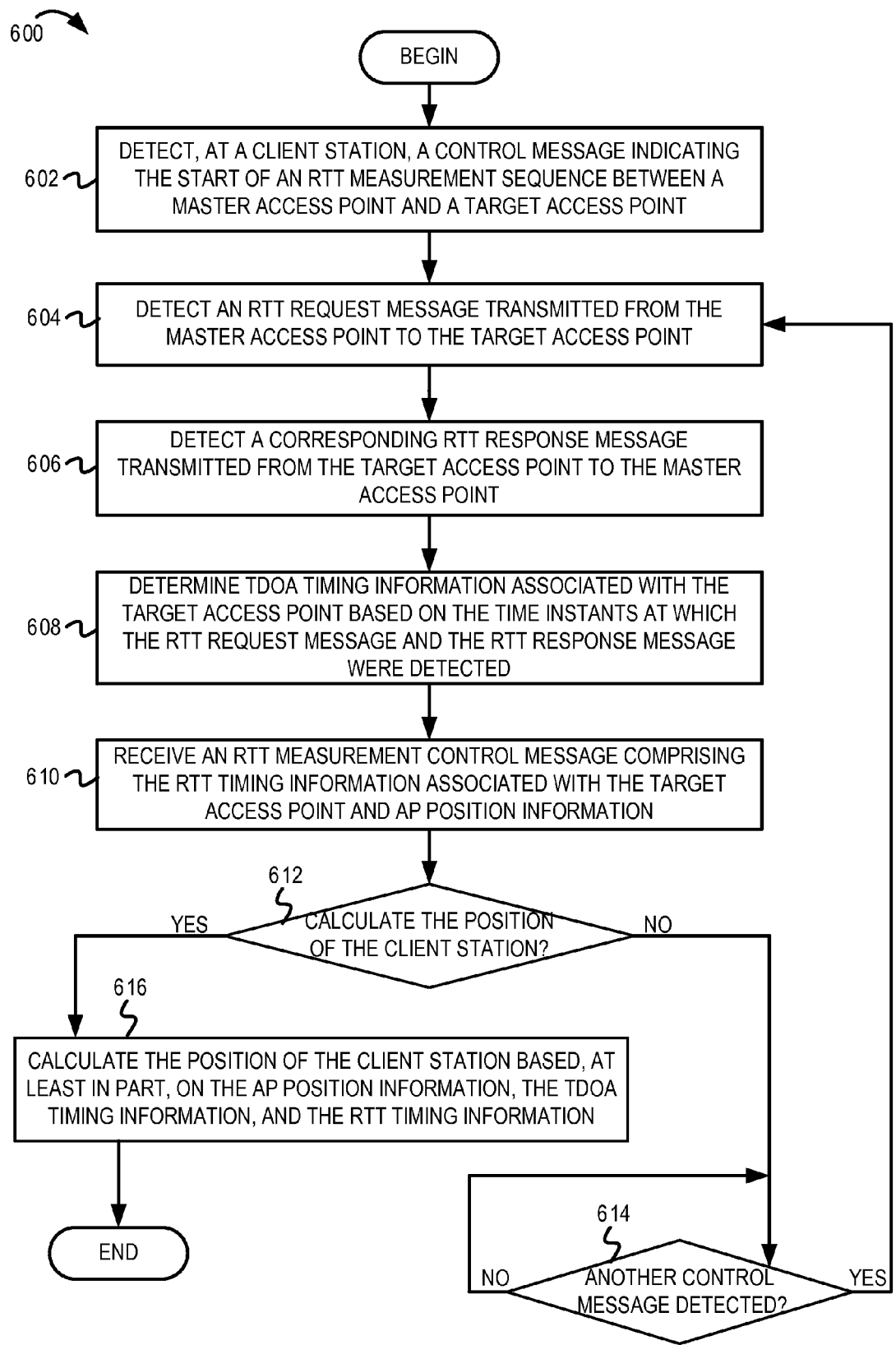
FIG. 6 is flow diagram illustrating example operations of another embodiment of a hybrid TDOA-RTT positioning mechanism for calculating the position of the client station.

FIG. 6 is a flow diagram 600 illustrating example operations of another embodiment of the hybrid TDOA-RTT positioning mechanism for determining the position of a client station. The flow 600 begins at block 602 in FIG. 6.

At block 602, a control message indicating the start of an RTT measurement sequence between a master access point and a target access point is detected at a client station. In some implementations, the master access point 102 may be configured to automatically initiate the RTT measurement sequence at periodic time intervals. The master access point 102 may broadcast a "RTT measurement initiated" control message to notify all the client stations in the communication range of the master access point 102 regarding the start of the RTT measurement sequence. The "RTT measurement initiated" control message can comprise an indication of a time instant at which the RTT request message will be transmitted (e.g., to ensure that the client stations are listening at the appropriate time instant), a communication channel via which the RTT request message will be transmitted, an identifier of the target access point 104, etc. The client position calculation unit 114 can detect the "RTT measurement initiated" control message and can listen on the appropriate communication channel for the RTT request message. The flow continues at block 604.

At block 604, a RTT request message transmitted from the master access point to the target access point is detected. For example, the client position calculation unit 114 can detect the RTT request message transmitted by the master access point 102 to the target access point 104. The client position calculation unit 114 can record the time instant at which the RTT request message was detected at the client station 112. The flow continues at block 606.

At block 606, a corresponding RTT response message transmitted from the target access point to the master access point is detected. For example, the client position calculation unit 114 can detect the RTT response message transmitted by the target access point 104 to the master access point 102. The client position calculation unit 114 can record the time instant at which the RTT response message was detected at the client station 112. The flow continues at block 608.

At block 608, TDOA timing information associated with the target access point is determined based on the time instants at which the RTT request message and the RTT response message were detected. In one implementation, as described in FIGS. 1-2, the client position calculation unit 114 can determine the TDOA timing information associated with the target access point 104 as a time difference between the time instants at which the RTT request message and the corresponding RTT response message were detected at the client station 112. The flow continues at block 610.

At block 610, an RTT measurement control message comprising the RTT timing information associated with the target access point and the AP position information is received. For example, the client position calculation unit 114 can receive the RTT measurement control message from the master access point 102. As described above in FIGS. 1-5, the RTT measurement control message can comprise the RTT timing information, the position, and/or the propagation time intervals associated with the target access point 104. The RTT measurement control message can also comprise the position and/or the propagation time intervals associated with the master access point 102. The flow continues at block 612.

At block 612, it is determined whether the position of the client station can be calculated. For example, the client position calculation unit 114 can determine whether the position of the client station 112 can be calculated. To determine whether the position of the client station 112 can be calculated, the client position calculation unit 114 can determine whether the TDOA timing information, the RTT timing information, and the AP position information associated with at least a predetermined number of target access points are known at the client station 112. If it is determined that the position of the client station 112 can be calculated, the flow continues at block 616. Otherwise, the flow continues at block 614.

At block 614, it is determined whether another control message is detected at the client station. The flow 600 moves from block 612 to block 614 if the client position calculation unit 114 determines that the position of the client station 112 cannot be calculated. For example, the client position calculation unit 114 can determine whether another "RTT measurement initiated" control message indicating the start of the RTT measurement sequence with another target access point 106 was detected. If it is determined that another "RTT measurement initiated" control message was detected at the client station 112, the flow loops back to block 604. Otherwise, the flow loops back to block 616 where the client position calculation unit 114 can wait to detect another "RTT measurement initiated" control message.

At block 616, the position of the client station is calculated based, at least in part, on the AP position information, the TDOA timing information, and the RTT timing information. The flow 600 moves from block 612 to block 616 if the client position calculation unit 114 determines that the position of the client station 112 can be calculated. As described above in FIGS. 1 and 2, the client position calculation unit 114 can construct at least a predetermined number of positioning equations from the TDOA timing information, the RTT timing information, and the AP position information. The client position calculation unit 114 can solve the positioning equations (expressed in accordance with Eq. 4) using any suitable techniques to determine the position of the client station 112. From block 616, the flow ends.

Although not depicted in FIG. 6, in some examples, the client position calculation unit 114 may detect the "RTT measurement initiated" control message (at block 602) but may not detect the RTT request message (at block 604) and/or the RTT response message (at block 606). In this example, the client position calculation unit 114 may wait to receive the RTT request/response messages for a predetermined time interval. If the client position calculation unit 114 does not detect the RTT request message and/or the RTT response message, the flow can move to block 614 and the client position calculation unit 114 can wait to receive the next "RTT measurement initiated" control message indicating the start of another RTT measurement sequence with the same or another target access point.

It should be understood that FIGS. 1-6 are examples meant to aid in understanding embodiments and should not be used to limit embodiments or limit scope of the claims. Embodiments may comprise additional circuit components, different circuit components, and/or may perform additional operations, fewer operations, operations in a different order, operations in parallel, and some operations differently. In some implementations, as depicted in FIG. 2, the positioning equations (see Eq. 4) may be expressed in terms of a range difference between the distance ($R_{APM-STA}$) from the client station 122 to the master access point 102 and the distance ($R_{AP-STA}$) from the client station 112 to the target access point 104. The client position calculation unit 114 may determine the position of the client station 112 by solving the positioning equations expressed in terms of the range difference. However, in other implementations, the client position calculation unit 114 may calculate the distance ($R_{APM-STA}$) between the client station 112 and the master access point 102 (as described in block 408 of FIG. 4). In this implementation, the client position calculation unit 114 can determine the positioning equations in terms of the distance ($R_{AP-STA}$) between from the target access point 104 and the client station 112. Knowledge of the distance between the client station 112 and the master access point 102 can provide additional redundancy and can improve the accuracy of the calculated position of the client station 112.

In some implementations, in addition to identifying the target access points within the AP cluster associated with the master access point 102 (described in block 302 of FIG. 3), the AP positioning unit 110 can also determine a communication channel on which to exchange RTT request/response messages with the target access points. In one implementation, if all the access points 102, 104, 106, and 108 are configured to communicate via a common communication channel, the AP positioning unit 110 can exchange RTT request/response messages with the target access points 104, 106, and 108 via the common communication channel. In another implementation, the AP positioning unit 110 can designate another positioning control channel via which to exchange RTT request/response messages with the target access points 104, 106, and 108. In another implementation, the AP positioning unit 110 can negotiate with (or can notify) the target access points 104, 106, and 108 of a channel switching sequence in accordance with which to switch across multiple communication channels. The AP positioning unit 110 can also notify the client station 112 of the one or more communication channels via which the RTT request/response messages will be exchanged. Accordingly, the client position calculation unit 114 may listen on the appropriate communication channel to detect the RTT request/response messages.

The AP positioning unit 110 can also indicate a channel number of the next communication channel on which the RTT request/response messages will be exchanged, a time interval after (or a time instant at) which the next set of RTT request/response messages will be exchanged, etc. For example, the AP positioning unit 110 can indicate this information in a beacon message, in the "RTT measurement initiated" control message, in the RTT measurement control message, in the RTT request message, or in another suitable control message. This can enable the client station 112 to switch to an inactive power mode (e.g., a sleep mode) when the client station 112 does not expect to detect the RTT request/response messages. The client station 112 can switch to the active power mode at the appropriate time instant to listen for and to detect the RTT request/response messages.

Although FIGS. 1-6 describe the master access point 102 providing an indication of the AP position information and the propagation time intervals as part of the RTT measurement control message, embodiments are not so limited. In other embodiments, the master access point 102 can transmit the indications of the AP position information and the propagation time intervals in any suitable message. For example, the master access point 102 can transmit the indications of the AP position information and the propagation time intervals in a beacon message, in the RTT request message, or in another separate control message. Alternately, in some implementations, the RTT measurement control message may not comprise the indications of the AP position information and the propagation time intervals. Instead, the RTT measurement control message may only comprise the RTT timing information associated with the target access point. In this implementation, the client position calculation unit 114 may access a database (or connect to and query a server) to determine the position and the propagation time intervals associated with the access points (e.g., based on knowledge of an access point identifier, such as a network address).

In some implementations, as described above, the client station (e.g., the client position calculation unit 114) can itself calculate the position of the client station 112. In other implementations, however, operations for calculating the position of the client station 112 can be offloaded to a server. The client station 112 can detect the RTT request/response messages, can determine the TDOA timing information, and can provide this information to the server. The server can receive the RTT timing information from the master access point 102 and can determine (e.g., from a local database) the AP position information and the propagation time intervals associated with the access points 102, 104, 106, and 108 and the client station 112. The server can then calculate the position of the client station 112, and can transmit an indication of the position of the client station 112 to the client station 112.

Although the Figures describe the AP positioning unit 110 determining the RTT timing information associated with the target access point 104 based on a single set of exchanged RTT request/response messages, embodiments are not so limited. In other embodiments, to improve the measurement quality, the AP positioning unit 110 can transmit multiple RTT request messages to the same target access point 104, receive multiple corresponding RTT response messages, average the RTT timing information over a predetermined time interval, and provide the average RTT timing information to the client station 112. In another embodiment, the AP positioning unit 110 can transmit multiple RTT request messages to the same target access point 104, receive multiple corresponding RTT response messages, determine multiple RTT timing information values, and provide the multiple RTT timing information values to the client station 112. The client station 112 can use some/all of the multiple RTT timing information values to determine the final RTT timing information associated with the target access point 104. Likewise, if the master access point 102 exchanges a single set of RTT request/response messages with the target access point 104, the client position calculation unit 114 can determine the TDOA timing information based on detecting the single set of RTT request/response messages. However, if the master access point 102 exchanges multiple sets of RTT request/response messages with the target access point 104, the client position calculation unit 114 can determine multiple values of the TDOA timing information and can calculate the average TDOA timing information over a predetermined time interval.

In some implementations, the wireless communication network 100 can comprise more than one master access point and the AP clusters associated with each of the multiple master access points can overlap. For example, a first and a second master access point may comprise a common set of target access points in their respective AP clusters if the common set of target access points are within the communication range of the first and the second master access points. In some implementations, the first and the second master access points can negotiate to partition their AP clusters. For example, the AP clusters can be partitioned such that a subset of the common set of target access points can be designated exclusively to the AP cluster associated with the first master access point and the remaining target access points of the common set can be designated exclusively to the AP cluster associated with the second master access point. In other implementations, the first and the second master access points may not partition their AP clusters. The client station 112 can receive and may (or may not) use redundant measurements to calculate its position.

Although the Figures describe the client station calculating its position based on an RTT measurement sequence initiated by the master access point 102 with target access points 104, 106, and 108 in the AP cluster, embodiments are not so limited. In some implementations, the client station 112 may detect multiple master access points but may be unable to detect any target access points in the AP clusters associated with the multiple master access points (e.g., because of environmental factors). In other implementations, the wireless communication network may only comprise multiple master access points (i.e., advanced access points with self-locating capabilities). In these implementations, the master access points may negotiate among themselves and can select one coordinating master access point. The other master access points may operate as target access points (e.g., may disable a master operating mode flag) associated with the coordinating master access point.

Lastly, it is noted that although FIGS. 4-5 describe each client station 112 transmitting a "start RTT measurement sequence" control message to cause the master access point 102 to initiate the RTT measurement sequence, embodiments are not so limited. In some embodiments, the client station 112 can determine whether an RTT measurement sequence is currently in progress before prompting the master access point 102 to initiate another RTT measurement sequence. For example, the client station 112 may listen on the wireless communication channel and may determine that a second client station has already transmitted a "start RTT measurement sequence" control message and that the corresponding RTT measurement sequence is already in progress. Therefore, the client station 112 may not transmit another "start RTT measurement sequence" control message to the master access point 102. Instead, the client station 112 may determine its position based on the ongoing RTT measurement sequence.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine-readable medium includes any mechanism for storing or transmitting information in a form (e.g., software, processing application) readable by a machine (e.g., a computer). A machine-readable medium may be a machine-readable storage medium, or a machine-readable signal medium. A machine-readable storage medium may include, for example, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of tangible medium suitable for storing electronic instructions. A machine-readable signal medium may include a propagated data signal with computer readable program code embodied therein, for example, an electrical, optical, acoustical, or other form of propagated signal (e.g., carrier waves, infrared signals, digital signals, etc.). Program code embodied on a machine-readable signal medium may be transmitted using any suitable medium, including, but not limited to, wireline, wireless, optical fiber cable, RF, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 7:
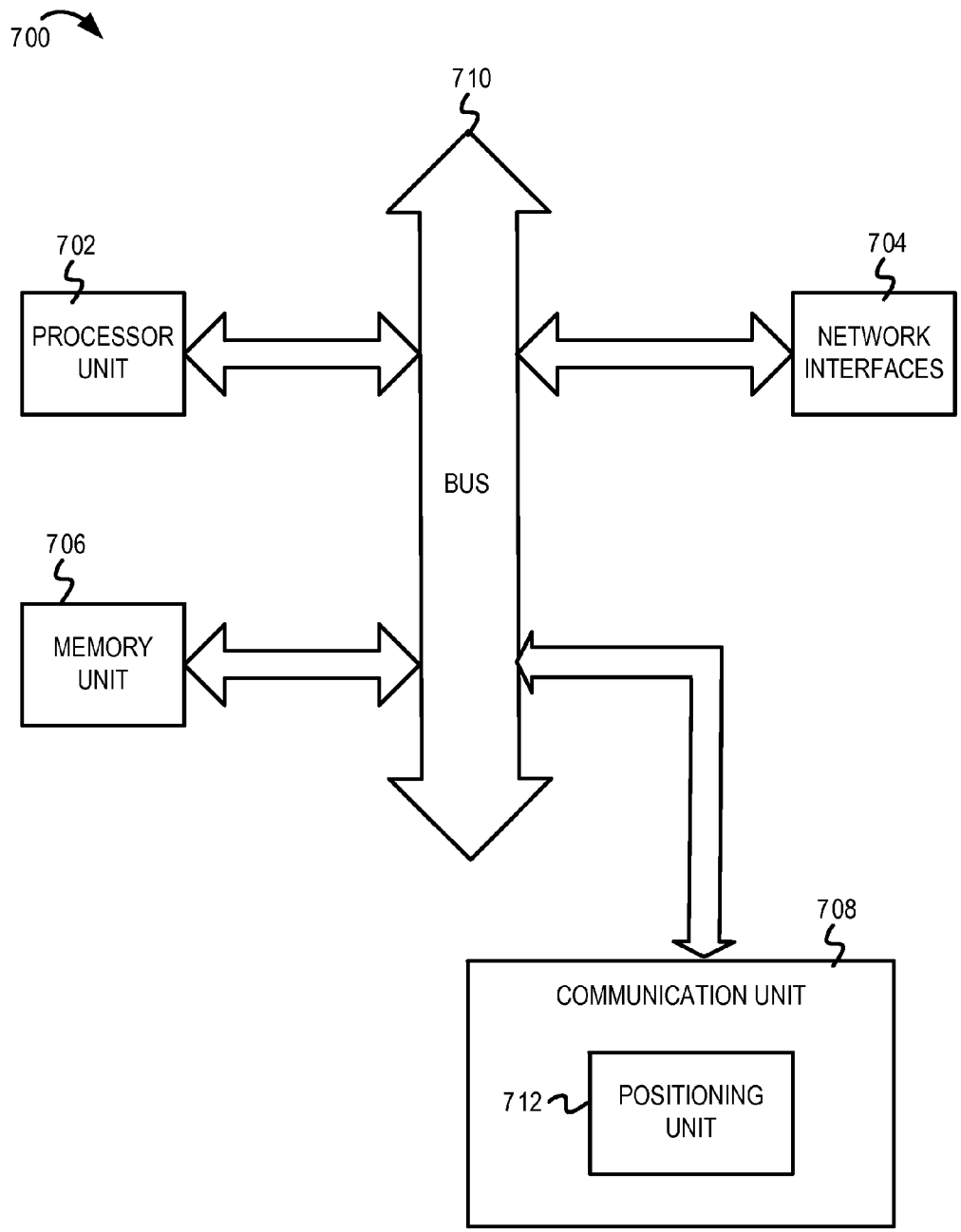
FIG. 7 is a block diagram of one embodiment of an electronic device including a hybrid TDOA-RTT positioning mechanism.

FIG. 7 is a block diagram of one embodiment of an electronic device 700 including a hybrid TDOA-RTT positioning mechanism. In some implementations, the electronic device 700 may be one of a notebook computer, a tablet computer, a netbook, a mobile phone, a gaming console, a personal digital assistant (PDA), or other electronic systems comprising a WLAN device with wireless communication capabilities. The electronic device 700 includes a processor unit 702 (possibly including multiple processors, multiple cores, multiple nodes, and/or implementing multi-threading, etc.). The electronic device 700 includes a memory unit 706. The memory unit 706 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic device 700 also includes a bus 710 (e.g., PCI, ISA, PCI-Express, HyperTransport®, InfiniBand®, NuBus, AHB, AXI, etc.), and network interfaces 704 that include at least one of a wireless network interface (e.g., a WLAN interface, a Bluetooth® interface, a WiMAX interface, a ZigBee® interface, a Wireless USB interface, etc.) and a wired network interface (e.g., an Ethernet interface, etc.).

The electronic device 700 also includes a communication unit 708. The communication unit 708 comprises a positioning unit 712. In some embodiments, the electronic device 700 can be configured as a WLAN client station. The positioning unit 712 can detect the RTT request/response messages exchanged between the master access point and at least a predetermined number of target access points to determine TDOA timing information associated with the target access points. The positioning unit 712 can determine the position of the electronic device 700 based, at least in part, on the RTT timing information, the TDOA timing information, and the AP position information, as described above with reference to FIGS. 1-6. In some embodiments, the master access point and the target access points can also be configured as the electronic device 700 of FIG. 7. In this embodiment, the master access point and the target access points can use the positioning unit to execute their respective operations described above with reference to FIGS. 1-3. Any one of these functionalities may be partially (or entirely) implemented in hardware and/or on the processor unit 702. For example, the functionality may be implemented with an application specific integrated circuit, in logic implemented in the processor unit 702, in a co-processor on a peripheral device or card, etc. Further, realizations may include fewer or additional components not illustrated in FIG. 7 (e.g., video cards, audio cards, additional network interfaces, peripheral devices, etc.). The processor unit 702, the memory unit 706, and the network interfaces 706 are coupled to the bus 710. Although illustrated as being coupled to the bus 710, the memory unit 706 may be coupled to the processor unit 702.

While the embodiments are described with reference to various implementations and exploitations, it will be understood that these embodiments are illustrative and that the scope of the inventive subject matter is not limited to them. In general, techniques for a hybrid positioning mechanism for wireless communication devices as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
   detecting, at a communication device of a wireless communication network, a request message and a corresponding response message exchanged between a master access point of the wireless communication network and a target access point of the wireless communication network;
   determining, at the communication device, time difference of arrival (TDOA) information based, at least in part, on the request message and the corresponding response message exchanged between the master access point and the target access point;
receiving, from the master access point, an indication of round-trip time (RTT) measurement information determined by the master access point based, at least in part, on the request message and the corresponding response message exchanged between the master access point and the target access point; and
calculating position information associated with the communication device based, at least in part, on the TDOA information and the RTT measurement information.

2. The method of claim 1, wherein calculating the position information associated with the communication device comprises:
receiving, from the master access point, position information associated with the master access point and position information associated with the target access point; and
calculating the position information associated with the communication device based, at least in part, on the TDOA information, the RTT measurement information, the position information associated with the master access point, and the position information associated with the target access point.

3. The method of claim 1, wherein calculating the position information associated with the communication device comprises:
determining position information associated with the master access point, position information associated with the target access point, a propagation time interval associated with the master access point, a propagation time interval associated with the target access point, and a propagation time interval associated with the communication device; and
calculating the position information associated with the communication device based on the TDOA information, the RTT measurement information, the position information associated with the master access point, the position information associated with the target access point, the propagation time interval associated with the master access point, the propagation time interval associated with the target access point, and the propagation time interval associated with the communication device.

4. The method of claim 3,
wherein the propagation time interval associated with the target access point comprises at least a time interval associated with a transmitter unit of the first target access point, a time interval associated with a receiver unit of the target access point, a time interval associated with a processing unit of the target access point, and an external propagation time interval between the master access point and the target access point; and
wherein the propagation time interval associated with the master access point comprises at least a time interval associated with a transmitter unit of the master access point and a time interval associated with a receiver unit of the master access point.

5. The method of claim 1, further comprising:
detecting request messages and corresponding response messages exchanged between the master access point and a plurality of target access points;
determining the TDOA information based, at least in part, on the request messages and the corresponding response messages exchanged between the master access point and plurality of target access points;
receiving the RTT measurement information from the master access point, the RTT measurement information determined by the master access point based, at least in part, on the request messages and the corresponding response messages exchanged between the master access point and the plurality of target access points; and
wherein calculating the position information associated with the communication device includes:
determining whether the TDOA information and the RTT measurement information associated with a predetermined number of target access points are available; and
calculating the position information associated with the communication device in response to determining that the TDOA information and the RTT measurement information associated with the predetermined number of target access points are available.

6. The method of claim 1, further comprising:
detecting the master access point within a predetermined communication range of the communication device;
receiving, from the master access point, an indication of the target access point associated with the master access point;
identifying that the target access point is within the predetermined communication range of the communication device; and
transmitting an indication to the master access point to cause the master access point to initiate an RTT measurement sequence involving the request message and the corresponding response message to determine the RTT measurement information associated with the target access point within the predetermined communication range of the communication device.

7. The method of claim 1, wherein receiving the indication of the RTT measurement information determined by the master access point comprises one of
receiving, from the master access point, the RTT measurement information associated with the target access point in a corresponding RTT measurement control message; or
receiving, from the master access point, the RTT measurement information associated with the target access point in a beacon message associated with the master access point.

8. The method of claim 1, further comprising:
determining, at the communication device, to calculate the position information associated with the communication device; and
in response to determining to calculate the position information associated with the communication device, providing a trigger message from the communication device to the master access point to cause the master access point to transmit the request message to the target access point and to determine the RTT measurement information associated with the target access point based on the request message and the corresponding response message exchanged between the master access point and the target access point.

9. The method of claim 1, further comprising:
receiving, from the master access point, a control message that indicates a start of an RTT measurement sequence involving the request message and the corresponding response message exchanged between the master access point and the target access point; and
in response to receiving the control message, determining the TDOA information associated with the target access point based, at least in part, on the request message and the corresponding response message exchanged between the master access point and the target access point.

10. The method of claim 9, wherein the control message comprises at least one of an identifier of the target access point, an identifier of the master access point, a communication channel for subsequent transmission of the request message to the target access point, and a time instant at which subsequent transmission of the request message to the target access point will be initiated.

11. The method of claim 1, further comprising:
receiving, from the master access point, an indication of one or more communication channels of the wireless communication network via which the request message and the corresponding response message are to be exchanged; and
listening on the one or more communication channels of the wireless communication network for to detect the request message and the corresponding response message exchanged between the master access point and the target access point in response to receiving the indication from the master access point.

12. The method of claim 1, further comprising:
receiving, from the master access point, a communication schedule in accordance with which the request message will be transmitted from the master access point to the target access point; and
determining whether to switch to an inactive power mode based, at least in part, on the communication schedule in accordance with which the request message will be transmitted from the master access point to the target access point.

13. The method of claim 1, further comprising:
listening on one or more communication channels of the wireless communication network to detect the request message and the corresponding response message exchanged between the master access point and the target access point.

14. The method of claim 1, wherein calculating the position information associated with the communication device does not involve the communication device transmitting any control messages to initiate RTT measurements.

15. A communication device comprising:
a processor;
a network interface coupled with the processor; and
a positioning unit coupled with the processor and with the network interface, the positioning unit operable to:
detect a request message and corresponding response message exchanged between a master access point of a wireless communication network and a target access point of the wireless communication network;
determine time difference of arrival (TDOA) information based, at least in part, on the request message and the corresponding response message exchanged between the master access point and the target access point;
receive, from the master access point, an indication of round-trip time (RTT) measurement information determined by the master access point based, at least in part, on the request message and the corresponding response message exchanged between the master access point and the target access point; and
calculate position information associated with the communication device based, at least in part, on the TDOA information and the RTT measurement information.

16. The communication device of claim 15, wherein the positioning unit is operable to:
detect request messages and corresponding response messages exchanged between the master access point and a plurality of target access points;
determine the TDOA information based, at least in part, on the request messages and the corresponding response messages exchanged between the master access point and plurality of target access points;
receive the RTT measurement information from the master access point, the RTT measurement information determined by the master access point based, at least in part, on the request messages and the corresponding response messages exchanged between the master access point and the plurality of target access points; and
wherein the positioning unit operable to calculate the position information associated with the communication device includes the positioning unit operable to:
determine whether the TDOA information and the RTT measurement information associated with a predetermined number of target access points are available; and
calculate the position information associated with the communication device in response to the positioning unit determining that the TDOA information and the RTT measurement information associated with the predetermined number of target access points are available.

17. The communication device of claim 15, wherein the positioning unit is further operable to:
detect the master access point within a predetermined communication range of the communication device;
receive, from the master access point, an indication of the target access point associated with the master access point;
identify that the target access point is within the predetermined communication range of the communication device; and
transmit an indication to the master access point to cause the master access point to initiate an RTT measurement sequence involving the request message and the corresponding response message to determine the RTT measurement information associated with the target access point within the predetermined communication range of the communication device.

18. The communication device of claim 15, wherein the positioning unit is operable to:
receive, from the master access point, a control message that indicates a start of an RTT measurement sequence involving the request message and the corresponding response message exchanged between the master access point and the target access point, wherein the control message comprises at least one of an identifier of the target access point, an identifier of the master access point, a communication channel for subsequent transmission of the request message to the target access point, and a time instant at which subsequent transmission of the request message to the target access point will be initiated; and
in response to the positioning unit receiving the control message, determine the TDOA information associated with the target access point based on the request message and the corresponding response message exchanged between the master access point and the target access point.

19. The communication device of claim 15, wherein the positioning unit is further operable to:
  determine to calculate the position information associated with the communication device; and
  in response to determining to calculate the position information associated with the communication device, provide a trigger message from the communication device to the master access point to cause the master access point to transmit the request message to the target access point and to determine the RTT measurement information associated with the target access point based on the request message and the corresponding response message exchanged between the master access point and the target access point.

20. One or more machine-readable storage media having instructions stored therein, which when executed by one or more processors causes the one or more processors to perform operations that comprise:
  detecting, at a communication device of a wireless communication network, a request message and a corresponding response message exchanged between a master access point of the wireless communication network and a target access point of the wireless communication network;
  determining time difference of arrival (TDOA) information based, at least in part, on the request message and the corresponding response message exchanged between the master access point and the target access point;
  receiving, from the master access point, an indication of round-trip time (RTT) measurement information determined by the master access point based, at least in part, on the request message and the corresponding response message exchanged between the master access point and the target access point; and
  calculating position information associated with the communication device based, at least in part, on the TDOA information and the RTT measurement information.

21. The machine-readable storage media of claim 20, wherein the operations further comprise:
  detecting the master access point within a predetermined communication range of the communication device;
  receiving, from the master access point, an indication of the target access point associated with the master access point;
  identifying that the target access point is within the predetermined communication range of the communication device; and
  transmitting an indication to the master access point to cause the master access point to initiate an RTT measurement sequence involving the request message and the corresponding response message to determine the RTT measurement information associated with the target access point within the predetermined communication range of the communication device.

22. The machine-readable storage media of claim 20, wherein the operations further comprise:
  determining to calculate the position information associated with the communication device; and
  in response to determining to calculate the position information associated with the communication device, providing a trigger message to the master access point to cause the master access point to transmit the request message to the target access point and to determine the RTT measurement information associated with the target access point based on the request message and the corresponding response message exchanged between the master access point and the target access point.

23. The machine-readable storage media of claim 20, wherein the operations further comprise:
  receiving, from the master access point, a control message that indicates a start of an RTT measurement sequence involving the request message and the corresponding response message exchanged between the master access point and the target access point, wherein the control message comprises at least one of an identifier of the target access point, an identifier of the master access point, a communication channel for subsequent transmission of the request message to the target access point, and a time instant at which subsequent transmission of the request message to the target access point will be initiated; and
  in response to receiving the control message, determining the TDOA information associated with the first target access point based, at least in part, on the request message and the corresponding response message exchanged between the master access point and the target access point.

* * * * *